Patented Feb. 26, 1929.

1,703,121

UNITED STATES PATENT OFFICE.

FRIEDRICH STOLZ, OF HOCHST-ON-THE-MAIN, AND WALTER KROHS, OF SODEN-IM-TAUNUS, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

AROMATIC ACID ESTERS OF THE α, α'-DIMETHYL-γ-HYDROXYPIPERIDINE-β-CARBOXYLIC ACID ESTERS AND PROCESS OF PREPARING THE SAME.

No Drawing. Application filed April 25, 1927, Serial No. 185,568, and in Germany May 17, 1926.

Our present invention relates to the manufacture of acid derivatives of the α, α'-dimethyl-γ-hydroxy-piperidine-β-carboxylic acid esters.

We have found that the aromatic esters of the α, α'-dimethyl-γ-hydroxypiperidine-β-carboxylic acid esters, which can be obtained by esterifying in known manner the said esters with aromatic acids, are local anesthetics of excellent properties. Their anesthetic power approaches closely that of cocaine whilst they are less toxic than cocaine and of greater efficacy than the para-amino-benzoyl-diethyl-aminoethanol.

The α, α'-dimethyl-γ-hydroxypiperidine-β-carboxylic acid ester can be obtained by reducing the corresponding piperidone. The latter is obtainable by the condensation of two molecules of acetaldehyde with ammonia and the dipotassium derivative from the dialkylester of the acetone dicarboxylic acid or by an intramolecular ester condensation of β,β-iminodibutyric acid ester.

The following example in which the manufacture of the benzoic acid ester of the α, α'-dimethyl-γ-hydroxy-piperidine-β-carboxylic acid methyl ester of the following formula:

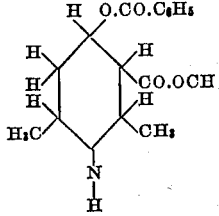

is described serves to illustrate our invention, but is not intended to limit it; the parts are by weight:

10 parts of the α, α'-dimethyl-γ-hydroxy-piperidine-β-carboxylic acid methyl ester (white crystals melting at 143° C.) are heated with 10 parts of chloroform and 30 parts of benzoyl chloride for 15 hours on the steam bath in a reflux apparatus. After cooling, 40 parts of water and 20 parts of ether are added to the mixture, and the whole is well stirred. During this operation most of the hydrochloride of the benzoyl compound separates in a crystalline form. This salt is filtered by suction, washed with ether, dried and recrystallized from a mixture of methyl alcohol and acetic ester. Its melting point is 206° C. From the aqueous liquor remaining after filtration of the hydrochloride, the excess of benzoyl chloride is taken off with ether. Then further quantities of the salt above described are prepared therefrom by adding a sodium carbonate solution, extracting with ether and converting the product so obtained into the hydrochloride. The aqueous solution of the latter gives an almost neutral reaction; by adding an alkali the base is precipitated therefrom as an oil. The benzoylation with benzoic anhydride can be effected in an analogous manner.

In the appended claims the terms "an aromatic acid compound" and "a benzoic acid compound" are used to include the free aromatic acids, their chlorides and anhydrides, and free benzoic acid, its chloride and anhydride, respectively.

We claim:

1. As a new product, the benzoic ester of the α, α'-dimethyl-γ-hydroxypiperidine-β-carboxylic methyl ester.

2. The process of preparing aromatic acid esters of the α, α'-dimethyl-γ-hydroxy-piperidine-β-carboxylic acid esters which comprises treating an α, α'-dimethyl-γ-hydroxypiperidine-β-carboxylic acid ester with an aromatic acid compound which is capable of esterifying the γ-hydroxyl-group of the said piperidine thereby forming an aromatic acid ester thereof.

3. The process of preparing benzoic acid esters of the α, α'-dimethyl-γ-hydroxy-piperidine-β-carboxylic acid esters which comprises treating an α, α'-dimethyl-γ-hydroxy-piperidine-β-carboxylic acid ester with a benzoic acid compound which is capable of esterifying the γ-hydroxyl-group of the said piperidine thereby forming the benzoic acid ester thereof.

4. The process of preparing benzoic acid esters of the α, α'-dimethyl-γ-hydroxy-piperidine-β-carboxylic acid esters which comprises treating an α, α'-dimethyl-γ-hydroxy-piperidine-β-carboxylic acid ester with benzoyl chloride thereby forming the benzoic acid ester of the said piperidine.

5. As new products aromatic acid esters of the α, α'-dimethyl-γ-hydroxy-piperidine-β-carboxylic acid esters.

6. As new products aromatic acid esters of the α, α'-dimethyl-γ-hydroxy-piperidine-β-carboxylic alkyl esters.

7. As new products aromatic acid esters of the α, α'-dimethyl-γ-hydroxy-piperidine-β-carboxylic methyl ester.

8. As new products benzoic acid esters of the α, α'-dimethyl-γ-hydroxy-piperidine-β-carboxylic acid esters.

9. As new products benzoic acid esters of the α, α'-dimethyl-γ-hydroxy-piperidine-β-carboxylic alkyl esters.

In testimony whereof, we affix our signatures.

FRIEDRICH STOLZ.
WALTER KROHS.